US011857980B2

(12) United States Patent
Mochizuki

(10) Patent No.: US 11,857,980 B2
(45) Date of Patent: Jan. 2, 2024

(54) FLOCCULATION AND MAGNETIC SEPARATION DEVICE; SYSTEM FOR PURIFYING MARINE PLASTIC, MICROPLASTIC, AND BALLAST WATER HAVING THE FLOCCULATION AND MAGNETIC SEPARATION DEVICE; SHIP EQUIPPED WITH THE SYSTEM; AND OPERATION METHOD OF THE SHIP

(71) Applicant: Ambitious Technologies, Ltd., Mito (JP)

(72) Inventor: Akira Mochizuki, Mito (JP)

(73) Assignee: Ambitious Technologies, LTD., Mito (JP)

( * ) Notice: Subject to any disclaimer, the term of this patent is extended or adjusted under 35 U.S.C. 154(b) by 128 days.

(21) Appl. No.: 17/595,216

(22) PCT Filed: Sep. 23, 2020

(86) PCT No.: PCT/JP2020/037045
§ 371 (c)(1),
(2) Date: Nov. 11, 2021

(87) PCT Pub. No.: WO2021/095383
PCT Pub. Date: May 20, 2021

(65) Prior Publication Data

US 2022/0219176 A1 Jul. 14, 2022

(30) Foreign Application Priority Data

Nov. 14, 2019 (JP) ................................ 2019-217469

(51) Int. Cl.
*B03C 1/247* (2006.01)
*B63B 79/40* (2020.01)
(Continued)

(52) U.S. Cl.
CPC .............. *B03C 1/247* (2013.01); *B63B 13/00* (2013.01); *B63B 35/32* (2013.01); *B63B 79/40* (2020.01); *G08G 3/00* (2013.01)

(58) Field of Classification Search
CPC ......... B03C 1/247; B03C 1/0332; B03C 1/12; B03C 1/30; B63B 13/00; B63B 35/32; G08G 3/00
See application file for complete search history.

(56) References Cited

U.S. PATENT DOCUMENTS 11,273,580 B2 * 3/2022 Milanovich ............. E02B 15/10
2006/0064242 A1 3/2006 Litvack et al.
(Continued)

FOREIGN PATENT DOCUMENTS

CN 209619975 U 11/2019
JP 2008-86892 A 4/2008
(Continued)

OTHER PUBLICATIONS

International Search Report (PCT/ISA/210) issued in PCT Application No. PCT/JP2020/037045 dated Dec. 15, 2020 with English translation (nine (9) pages).
(Continued)

*Primary Examiner* — Patrick H Mackey
(74) *Attorney, Agent, or Firm* — Crowell Moring LLP

(57) ABSTRACT

In a conventional flocculation and magnetic separation device, it was not possible to make the device downsized because the flocs are easily broken. In addition, there was no system for the ballast water treatment that is capable of simultaneous removal of plastics and microplastics drifting in the ocean. Furthermore, there were no ships and their navigation method capable of solving the pollution problem caused by plastics and microplastics floating in the ocean. By arranging a magnetic drum that rotates in a direction
(Continued)

opposite to the flow of a fluid containing flocs and by changing the flow path by about 180 degrees or so immediately before contacting the magnetic drum, the flocs can be removed without breaking. This method can downsize the size of the magnetic drum with the required area reduced. By combining small-sized flocculation and magnetic separation device and a device that breaks and recovers floating plastics, it is possible to remove plastics and microplastics floating in the ocean at the same time. By taking into account the status of marine plastics in the ship's planned route information, it becomes possible to remove plastics and microplastics floating on the ocean by the ship.

2 Claims, 11 Drawing Sheets

(51) Int. Cl.

| | |
|---|---|
| ***B63B 13/00*** | (2006.01) |
| ***B63B 35/32*** | (2006.01) |
| ***G08G 3/00*** | (2006.01) |

(56) References Cited

U.S. PATENT DOCUMENTS

| | | | | |
|---|---|---|---|---|
| 2010/0006490 | A1 | 1/2010 | Fukuyo et al. | |
| 2011/0168639 | A1 | 7/2011 | Isogami et al. | |
| 2011/0215041 | A1* | 9/2011 | Isogami | C02F 1/48 210/205 |
| 2014/0231326 | A1* | 8/2014 | Biley | E01H 12/004 210/170.01 |

FOREIGN PATENT DOCUMENTS

| | | | | | |
|---|---|---|---|---|---|
| JP | 2008-513779 | A | | 5/2008 | |
| JP | 2009-101341 | A | | 5/2009 | |
| JP | 2011-143330 | A | | 7/2011 | |
| JP | 2011-183271 | A | | 9/2011 | |
| JP | 2013-166544 | A | | 8/2013 | |
| JP | 2015-51764 | A | | 3/2015 | |
| JP | 2016-101539 | A | | 6/2016 | |
| JP | 2016101539 | A | * | 6/2016 | |
| JP | 2018-73074 | A | | 5/2018 | |
| JP | 2018089561 | A | * | 6/2018 | B03C 1/0332 |

OTHER PUBLICATIONS

Japanese-language Written Opinion (PCT/ISA/237) issued in PCT Application No. PCT/JP2020/037045 dated Dec. 15, 2020 (five (5) pages).

International Preliminary Report on Patentability (PCT/EPEA/408) issued in PCT Application No. PCT/JP2020/037045 dated Jul. 6, 2021 (seven (7) pages).

International Preliminary Report on Patentability (PCT/IB/416 & PCT/EPEA/409) issued in PCT Application No. PCT/JP2020/037045 dated Oct. 27, 2021 (11 pages).

JMC Journal. vol. 67, No. 5, Japan Machinery Center for Trade and Investment, 2019, pp. 1-16, (Kaneda, Takeshi. Current State and Challenges of Marine Plastic Waste Problem.) dated May 2019 (16 pages).

* cited by examiner

FLOCCULATION AND MAGNETIC SEPARATION DEVICE; SYSTEM FOR PURIFYING MARINE PLASTIC, MICROPLASTIC, AND BALLAST WATER HAVING THE FLOCCULATION AND MAGNETIC SEPARATION DEVICE; SHIP EQUIPPED WITH THE SYSTEM; AND OPERATION METHOD OF THE SHIP

TECHNICAL FIELD

The present invention relates to a low-cost and space-saving flocculation and magnetic separation device; and relates to a purifying system for marine plastic, microplastic, and ballast water, and relates to a ship equipped with the purifying system; and further relates to a method of operation of the ship. The invented device flocculates floating matter in a fluid a together with magnetic substances such as magnetite to produce flocs and makes the flocs so flocculated contact with a magnetic drum having magnets to allow effective and eased separation from the fluid, wherein the magnetic drum rotates in the opposite direction to the direction of the flow of the fluid containing floating matter.

BACKGROUND ART

There exist Patent Documents 1 to 4 as background techniques in the technical field of the present invention.

Patent Literature 1 discloses a magnetic drum type flocculation and magnetic separation device in which the drum rotates in the same direction as the flow direction of the fluid.

Patent Literature 2 discloses a ballast water treatment method; in which, in sucking plankton or the like in the ocean by a pump into a ballast tank, the plankton is broken by a slit and further ozone-sterilized.

Patent Literature 3 discloses a method of a ballast water treatment system. In the system, the treated ballast water is subjected to a water quality inspection, and if the inspection result does not satisfy the values specified in the ballast water discharge regulation, the ballast water treatment is performed again.

Patent Literature 4 discloses a method of cleating a planned course that will reduce the occurrence of a complicated route relationship with other ships that is hard to determine a safe course while maintaining economic efficiency in selecting the course.

CONVENTIONAL ART

Patent Literature

{Patent Literature 1} Japanese Published Unexamined Patent Application No. 2016-101539

{Patent Literature 2} Japanese Published Unexamined Patent Application No. 2008-86892

{Patent Literature 3} Japanese Published Unexamined Patent Application No. 2015-51764

{Patent Literature 4} Japanese Published Unexamined Patent Application No. 2018-73074

SUMMARY OF INVENTION

Technical Problem

Plastic discarded into the ocean has become a global ocean pollution problem. In addition, these plastics are broken down into small pieces by ultraviolet light and fluid power. These plastics and microplastics, which are tens of microns to several millimeters in size, are accidentally introduced into the body of fish and other aquatic organisms as food. It has been reported that some marine organisms die as a result. In addition, microplastics may have harmful substances attached to them, and there are concerns that eating fish that contain such microplastics may have an enormous impact on human health. Therefore, a method is desired to removing plastics and microplastics floating in the ocean.

In Patent Literature 1, floating matters and magnetite in raw water are aggregated to form flocs, and a fluid containing the flocs flows toward a magnetic drum that rotates in the same direction as the flow of the fluid. A weir is provided to control the flow rate and the flocs are separated from the water and recovered by magnetic force. However, in this method, since the flow direction of the fluid and the rotation direction of the magnetic drum are in the same direction, the fluid is accelerated in the flow direction of the drum due to the viscosity of the fluid. Therefore, the fluid that has passed over the weir is accelerated by the rotation of the drum, so that flow separation occurs at the corners of the weir, then a shearing force acts on the flocs around the weir, thus the flocs are easily broken. Therefore, in order to prevent the magnetic flocs break, it is necessary to reduce the rotation speed of the drum and the flow velocity of the pump. In addition, the size of the floc is several hundred microns to several millimeters, which is much larger than that of a fluid molecule, for example, a water molecule, therefore the fluid resistance is large. In order for the flocs to be attracted to the magnetic drum by the magnetic force acting in the direction perpendicular to the flow direction without breaking the flocs, a certain amount of time is required for the flocs to approach the magnetic drum, and the flow speed cannot be increased for the above reasons. Therefore, in order to increase the flow rate, the flow channel area must be increased, and in addition, the diameter of the magnetic drum must be increased, or alternatively, the number of magnetic drums must be increased. Because of this, there left a problem that increasing the flow rate would make the device large.

In Patent Literature 2, in order to kill plankton and other aquatic organisms in the water, at the time when ballast water is pumped in, the plankton and other organisms are broken by slits, and then the plankton is sterilized by ozone or other means. However, this method has a problem that the method cannot solve marine pollution caused by plastics and microplastics.

In Patent Literature 3, a ballast water purification system has been disclosed. In the disclosed art, the ballast water is treated by flocculation and magnetic separation while monitoring the water quality. However, no consideration was given to the removal of plastics or solving marine pollution problems.

In the art described in Patent Literature 4, the course information of other ships in the vicinity of the sea area through which specific vessels pass is obtained and accumulated. With that course information, efficient course plan information is produced. However, no consideration was given to marine pollution by discarded plastics.

Solution to Problem

To solve the above-stated problem, the present invention proposes a flocculation and magnetic separation device.

The invented device comprises:

a stirrer that produces flocs by putting flocculant, magnetic material, and polymer into a fluid containing plastic and plankton and agitating that fluid;

a first magnetic drum having magnets on the surface thereof to attract the flocs thereon, wherein the first magnetic drum rotates in the direction opposite to the flow direction of the floc-contained fluid to create eddies for attracting the flocs thereto;

a second magnetic drum having magnets on the surface thereof to attract the flocs, wherein this second magnetic drum rotates in the same direction as a fluid of which flow direction being changed at a bump-like protrusion arranged at the rear of the first magnetic drum so that the fluid will not cause peeling off of the flocs attracted to the second magnetic drum; and a floc recovering section for recovering by grouping the flocs attracted to the first magnetic drum and to the second magnetic drum into one.

The flocculation and magnetic separation device by the present invention, comprises:

a stirrer that produces flows by putting flocculant, magnetic material, and polymer into a fluid containing plastic and plankton and agitating that fluid;

a rotating drum having a non-magnetic surface rotating in the same direction as the flow of said floc-containing fluid to flow said flocs; and a magnetic drum having magnets on the surface thereof to attract the flocs thereon, wherein the magnetic drum rotates in the direction opposite to the flow direction of the floc-contained fluid, wherein the floc-contained flow is a direction-changed flow changed at the bump-like protrusion provided rear of the rotating drum so as to attract the flocs to the magnetic drum; and a floc recovering section for recovering the flocs attached to the magnetic drum.

The flocculation and magnetic separation device comprises a pipe, into which a fluid containing plastic broken by a slit mechanism flows;

wherein the slit mechanism has:

a first slit section provided on the pipe at a predetermined angle and a second slit section provided at the rear stage of the first slit section at a predetermined angle different from the predetermined angle;

wherein the cross section of both a slit plate of the first slit section and a slit plate of the second slit section is acute with respect to the flow-in direction.

Advantageous Effects of Invention

The present invention provides a small-sized low-cost floc recovering device. The invented device is able to recover flocs using magnetic force without breaking them. The flocs to be recovered or collected includes an aggregation of matters floating on a fluid, like magnetic substance such as magnetite and bio-plankton and microplastic. In addition, the invented device has an effect for solving the marine pollution problem by breaking and recovering plastics floating in the ocean using a slit, and further by recovering microplastic that cannot be broken by the slit by flocculation and magnetic separation. In addition, the marine pollution can be efficiently removed by determining the ship course to a sea area where a large quantity of plastics are floating using satellite information and collecting marine plastic in such sea areas where amounts of marine plastics are floating.

DESCRIPTION OF EMBODIMENTS

Hereinafter, embodiments of the present invention will be described with reference to the accompanying drawings.

EXAMPLES

Figure 1:
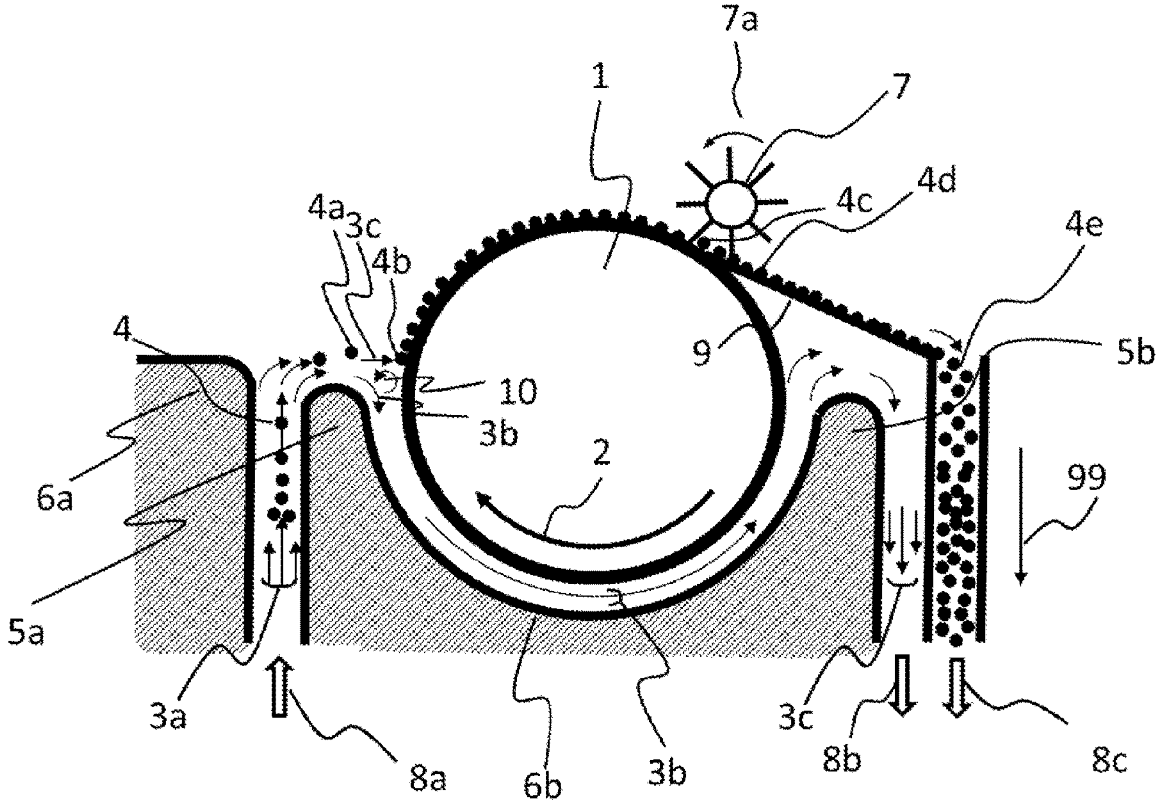
FIG. 1 This figure is a side view of an example of a configuration diagram of the magnetic separating section of the flocculation and magnetic separation device of the present invention.

FIG. 1 shows an embodiment example of a magnetic separating section of the flocculation and magnetic separation device of the present invention. A magnetic drum 1 having magnets near the surface thereof and flocs 4, containing a magnetic substance such as magnetite, on the flow 8*a* from the flocculation section, which is not shown in the figure, flow toward the drum 1 in the ascending direction opposite direction to the gravity direction 99. A flow velocity distribution 3*a* in a flow 8*a* has the highest flow velocity about or at the center and the slowest flow velocity on the wall of the flow channel. Therefore, the flocs collect in the portion of the flow where its velocity is high and its pressure is low in accordance with Bernoulli's equation. In order to prevent the fluid in front of the magnetic drum 1 from separating off from a bump-like protrusion 5*a*, the direction of the flow is changed by about 180 degrees or so at the bump-like protrusion 5*a* having a predetermined curvature.

At that time, the flow in the vicinity of the bump-like protrusion 5*a* flows along a curved wall 6*b*, because the height of the bump-like protrusion 5*a* is lower than the maximum height of a wall 6*a* that forms one wall of the flow channel. The flock 4 rises and becomes a flock 4*a* carried on a flow close to the surface of the liquid of the flow of the bump-like protrusion 5*a*, and flows toward the magnetic drum 1. Since the direction of rotation of the magnetic drum 1 is opposite to that of a fluid flow 3*b*, fine eddies 10 are created, and the eddies 10 cancels out the velocity of the fluid, causing the floc 4*a* to float on the surface of the water with almost zero velocity. The flocs 4*a* on the surface of the water is attracted by the magnetic force of the magnet of the magnetic drum 1, and move closer to the magnetic drum 1, and sticks on the magnetic drum 1 by magnetic force. When the flocs 4*a* on the water surface are attracted to the magnetic drum 1 by magnetic force and pulled up from the water surface, the forces acting on the flocs are surface tension and magnetic force. Since the surface tension is a weak force, the flocs 4*a* are not broken. The magnetic drum 1 rotates in an opposite direction 2 to the flow direction of the flow 3*b*, the flocs 4*b* on the drum are, therefore, separated immediately from the fluid. Therefore, the area of the magnetic drum 1 required for the magnetic drum 1 to separate magnetically the flocs 4*a* is small.

Therefore, the magnetic drum 1 can be downsized because there is no need to take into account the travel time until the floc 4*a* defies the fluid resistance and adheres to the magnetic drum 1 by magnetic force. The floc 4*b* moves with the rotation of the magnetic drum 1 and collides with a scraper 9. Flocs 4*c* on the magnetic drum 1 are peeled off from the magnetic drum 1 by the scraper 9 pressed against the magnetic drum 1, and a brush roller 7 rotating in a direction 7*b* opposite to a rotating direction 2. The scraper 9 is supported in slant from a higher position to a lower position. Therefore, flocs 4*d* that have moved from the magnetic drum 1 onto the scraper 9 move on the scraper 9 by gravity and are recovered in the free-falling as flocs 4*e*. As shown with the flow 3*b*, the treated water, from which flocs have been removed from the fluid, flow through the flow channel formed by the magnetic drum 1 and a wall 6*b*, and then the direction of the flow is changed by 180 degrees or so at a bump-like protrusion 5*b*. The treated water falls freely with a velocity distribution 3*c* and is discharged as a flow 8*b*. Further, the flocs 4*e* are discharged as a flow 8*c*. The flow velocity in the area between the bump-like protrusion 5*b* and the magnetic drum 1 is slow and close to zero. Therefore, even if flocs 4 that were not removed in the vicinity of the bump-like protrusion 5*a* are present, they are attracted to the magnetic drum 1 in the vicinity of the bump-like protrusion 5*b* and are removed from the treated water.

Figure 2:
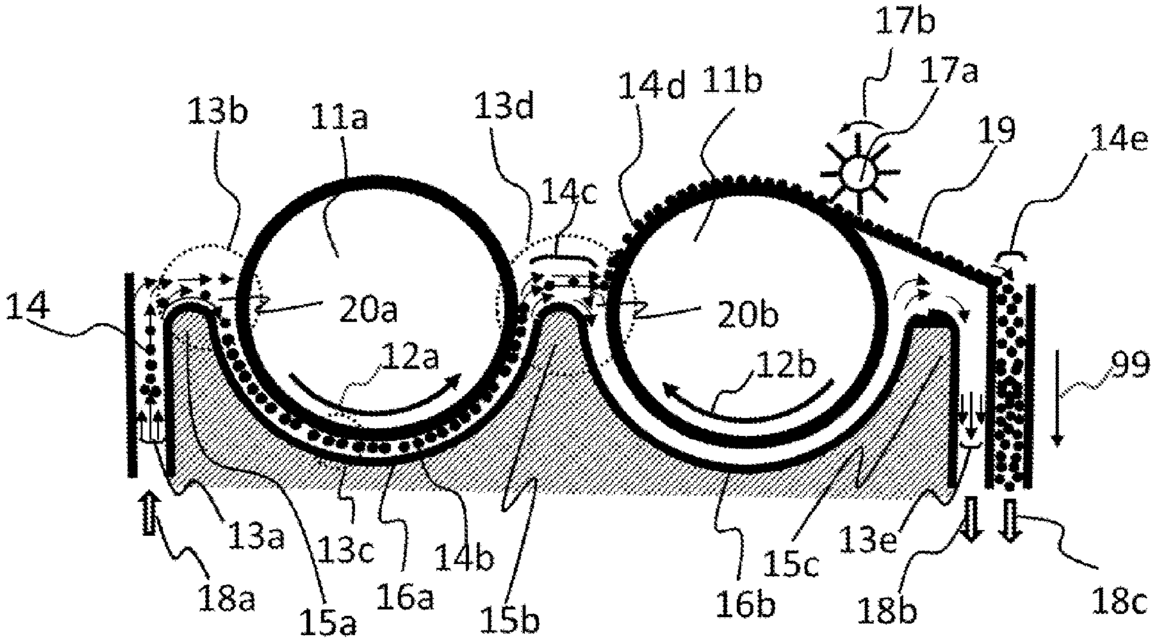
FIG. 2 This figure is a side view of an example of a configuration diagram of a separating section in a flocculation magnetic device of the present invention which device employs one fluid acceleration drum and one magnetic drum of the present invention.

FIG. 2 shows an embodiment example of the separating section of a flocculation and magnetic separation device using a rotating drum 11*a* that gives a flow velocity to the fluid and one magnetic drum 11*b*. The non-magnetic rotating drum 11*a* rotates in a direction 12*a* same as a flow 18*a* which includes flocs 14 and rotates at the rotation speed such that the peripheral speed thereof is at least equal to or higher than the average speed of a flow velocity. By forcibly increasing the flow velocity on the surface as in the Couette Flow, there is an effect that the portion of the flow having the highest flow velocity is brought closer to the vicinity of the rotating drum 11*a*. The purpose of this is to increase the probability that the flocs will collect in a place where the flow velocity is high, that is, where the pressure is low, and that the flocs will be carried by a flow flowing to a magnetic drum 12*b* that is located at the subsequent stage and rotates in the opposite direction. From the flocculation area, which is not shown in the figure, the fluid including flocs flows toward the rotating drum 11*a* rotating in the direction 18*a*, which is opposite to the direction of gravity 99. As shown in a velocity distribution 13*a* in the fluid, the velocity is fastest about in the center of the flow channel. The flocs 14, therefore, collect in the center of the flow. The direction of the flow is changed by 180 degrees or so at a bump-like projection 15*a* having a predetermined curvature. In a vicinity 13*b* of the bump-like protrusion 15*a*, the rotational force of the rotating drum 11*a* increases the speed of the flow. Therefore, the flow containing the flocs does not stay in the vicinity of the rotating drum 11*a* but flows toward a wall 16*a*. The high-velocity part of the flow 13*b* in the flow channel formed by the rotating drum 11*a* and the wall 16*a* is closer to the rotating drum 11*a* than when the drum 11*a* is not rotating. This is attributable to the peripheral velocity of the rotating drum 11*a*. Therefore, in a flow 13*d* in the vicinity of a bump-like protrusion 15*b* with curvature, the flow velocity is the highest at the part near the periphery. Flocs 14*c* collects in such a high flow velocity part and heads toward the magnetic drum 11*b*. In the vicinity of the magnetic drum 11*b*, there is a stagnant basin where the flow velocity is slowed down to almost zero by eddies 20*b*. Due to this almost-zero velocity, flocs 14*b* are attracted to the magnetic drum 11*a* rotating in the rotational direction 12*a* and are moved then released from the magnetic drum 11*b* by a slant-installed scraper 19 and a brush roller 17*a* which rotates in a rotational direction 17*b* opposite to a rotational direction 12*b*. The scraper 19 is supported in slant from a higher position to a lower position. Therefore, the flocs that have moved from the magnetic drum 11*b* onto the scraper 19 move on the scraper 19 by gravity and are recovered by free-falling as flocs 14*e*. The treated water from which the flocs have been removed flows around the magnetic drum 11*b*, and the direction of flow is changed by about 180 degrees or so at a bump-like protrusion 15*c* and is discharged by the gravity as a flow 18*b* with a velocity distribution 13*e*. Flocs 14*e* is also discharged as a flow 18*c*.

Figure 3:
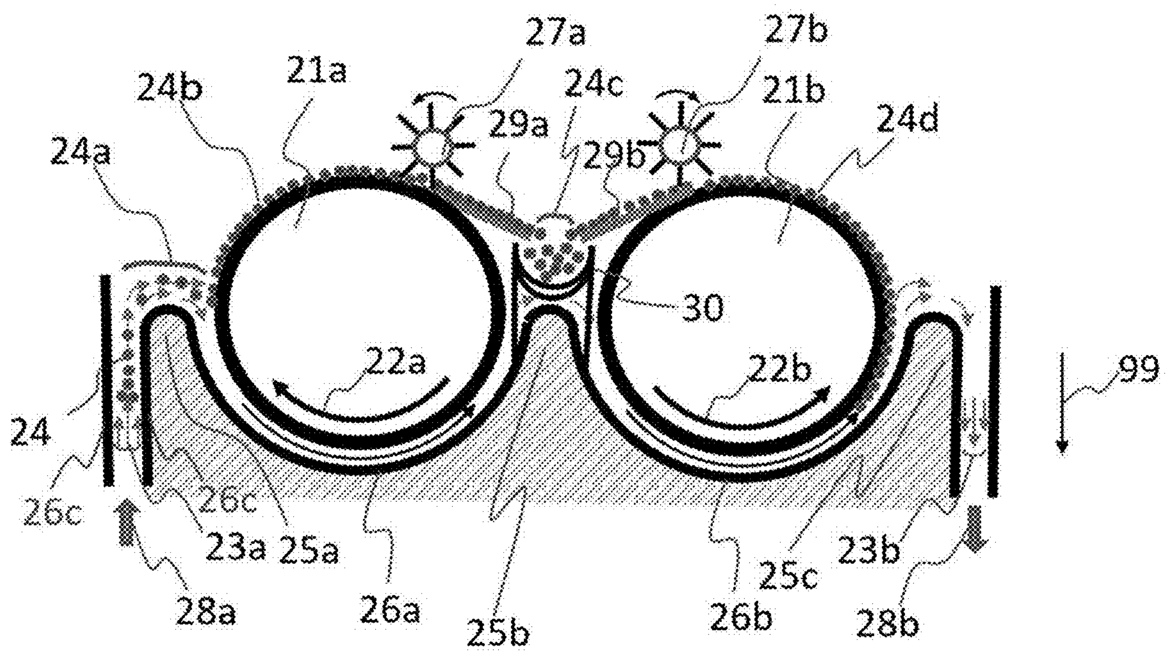
FIG. 3 This figure is a side view of an example of a configuration diagram of the magnetic separating section of the flocculation magnetic device of the present invention which device employs two magnetic drums.

FIG. 3 shows an embodiment example of the present invention, which example is the magnetic separating section of the flocculation and magnetic separation device using two magnetic drums. The device of the present invention comprises a first magnetic drum 21*a* and a second magnetic drum 21*b* arranged front and back each other. The first magnetic drum 21*a* rotates in a direction 22*a* opposite to the direction of the flow that includes flocs and the second magnetic drum 21*b* rotates in a direction 22*b* the same as the flow that includes flocs. The flocculating section, though not shown in the figure, produces a flock-contained fluid by flocculating floating matters in a fluid together with magnetic substances such as magnetite. A flock-contained fluid flows out from the flocculation section, carried on a flow 28*a*, of which flow direction is opposite to the gravity direction 99, and heads toward the first magnetic drum 21*a* beyond a bump-like protrusion 25*a*. The flow 28*a* has the highest flow velocity about or at its center and the slow flow velocity in the vicinity of the wall 26*c* of the flow channel. Therefore, the flocs collect in the portion of the flow where its velocity is high and its pressure is low according to Bernoulli's equation and the distribution of velocity forms as shown with a velocity distribution 23*a*. In order to prevent the fluid from separating at a bump-like protrusion 5*a* provided at the front of the magnetic drum 1, the direction of the flow is changed by about 180 degrees or so at that bump-like protrusion 5*a* having a predetermined curvature.

Figure 8:
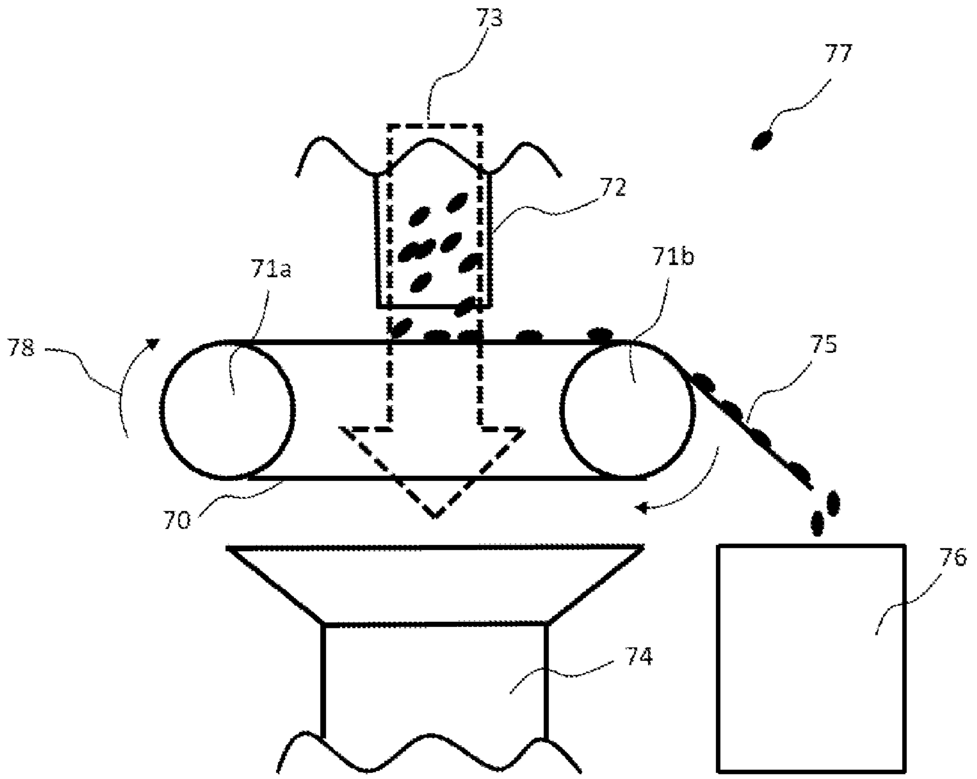
FIG. 8 This figure shows an example of the marine plastic recovery system of the present invention.

Like the velocity distribution 23*a*, the velocity in the fluid is fastest in the center of the flow channel; the flocks 24, therefore, collect in the center of the flow. At the time when the direction of the flow is changed largely by 180 degrees or so at the bump-like projection 25*a* having a predetermined curvature, the flow velocity in the outer circumference reaches the fastest, therefore, the flocks 24 move to the flocs 24*a* carried on a flow in the vicinity of the fluid surface, and the flocks 24*a* head the magnetic drum 21*a*, carried on a flow flowing toward the magnetic drum 21*a*. And further are attracted to the magnetic drum 21*a* by the magnetic force of the magnet on the surface thereof. Flocs 24*b*, which are attracted to the surface of the magnetic drum 21*a* by magnetic force, attach on the magnetic drum 21*a* rotating in the rotation direction 22*a*. Flocs 24*b*, which are attracted to the surface of the magnetic drum 21*a* by magnetic force, attach on the magnetic drum 21*a* rotating in the rotation direction 22*a*. Then the flocs 24*b* so attached to the magnetic drum 21*a* are separated therefrom by a scraper 29*a*, which is pressure-contacted to the magnetic drum 21*a*, and by a brush 27*a*. Being separated, the flocs 24*c* move on the scraper 29*a* and recovered into a floc recovering section 30. Since the direction of rotation of the magnetic drum 21*a* and the fluid flowing in the flow channel between the magnetic drum 21*a* and a curved wall 26*a* of the flow channel are opposite in velocity direction, eddies are generated in the fluid. The eddies cause the flocs to adhere to the magnetic drum. In this instance, however, the rotation speed of the magnetic drum 21*a* needs to be low enough that the eddies do not break the flocs, and the rotation speed is controlled considering the flocculation state. The flow direction of the fluid is greatly changed by a bump-like protrusion 25*b*, resulting in the movement of flogs toward the magnetic drum 21*b*, and the magnetic force causes the flocs 24*d* to attach to the magnetic drum 21*b*. Since the flow direction of the fluid and the rotation direction of the magnetic drum 21*b* is the same, there imposed no shearing or other force from the fluid, therefore the floc 24*d* on the surface of the magnetic drum 21*b* will not be separated by the fluid. The magnetic drum 21*b* rotates in the direction of rotation 22*b*, and the floc 24*d* on the magnetic drum 21*b* is scraped off by a scraper 29*b* which is in pressure-contact and by a brush 27*b*. The scraped flocs are then collected in the floc collection section 30, as shown with the flocs 24*c*. In the present invention, the floc collection section 30 can be integrated into one, so that the cost can be reduced. Instead of using the magnetic drum 21*b*, a filter separation method, as shown in FIG. 8, may be used. In the filter separation method, the same effect can be achieved by using a filter mesh of 47 microns or less so as to meet the removal standards for ballast water purification systems.

Figure 4:
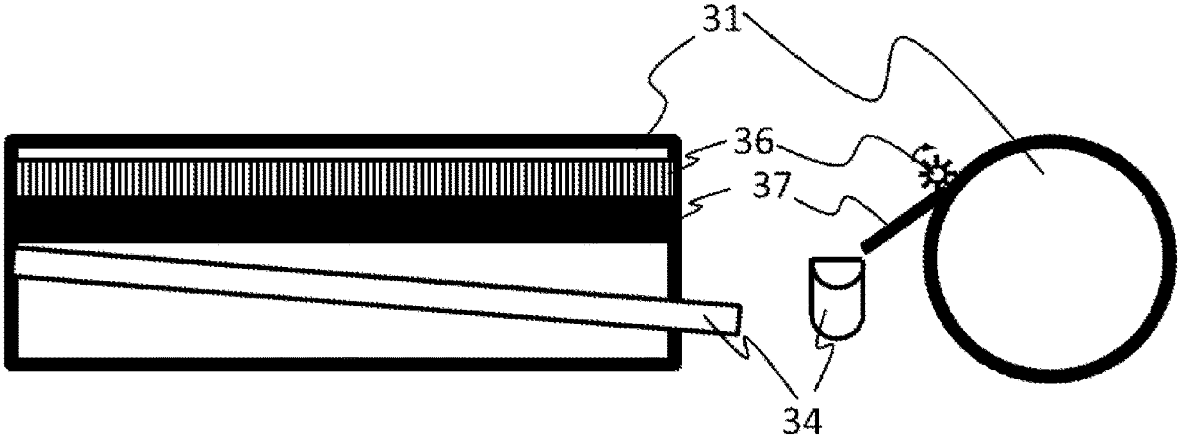
FIG. 4 This figure shows an example of a floc recovery section in the flocculation and magnetic separation device of the present invention.

FIG. 4 shows an embodiment example of the floc recovery section in the flocculation and magnetic separation device of the present invention. A recovery section 34 consists mainly of a magnetic drum 31, a scraper 37 pressed against thereto, and a brush roller 36 used to peel off the flocs attracted by magnetic force on the surface of a magnetic drum 31. The flocs moved from the magnetic drum 31 by the brush roller 36 onto the scraper 37 are moved further by gravity and collected in the floc recovery section 34. Since the floc recovery section 34 is arranged in slant, the flocs move by gravity and are discharged from the end of the floc recovery section 34. The floc recovery section 34 has a semi-cylindrical shape to collect the flocs, but a concave or inverted triangular cross-section is also acceptable.

Figure 5:
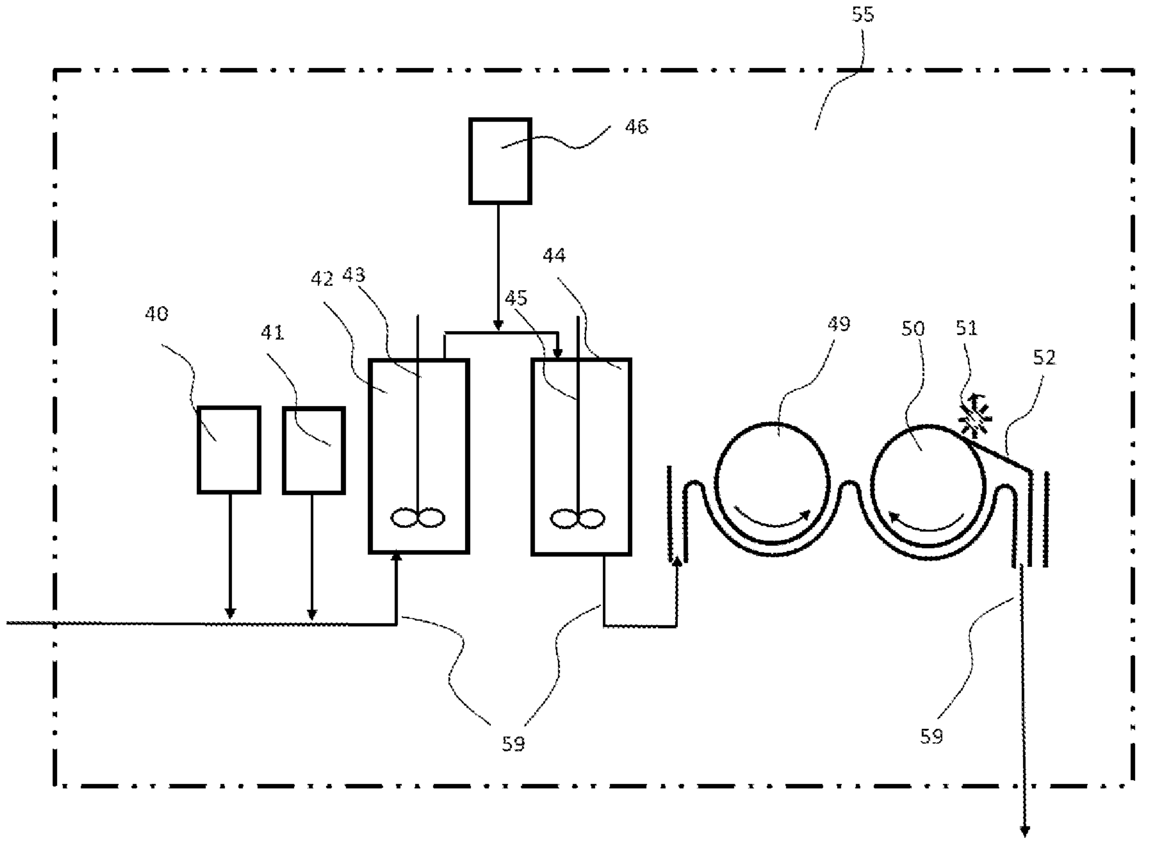
FIG. 5 This figure shows an example of the configuration diagram of the flocculation and magnetic separation device of the present invention.

FIG. 5 shows an example of the embodiment configuration of the flocculation and magnetic separation device. In this configuration, a fluid 59 flows into a flocculation and magnetic separation device 55, and the appropriate amount of flocculant from a flocculant storage tank 40 and the appropriate amount of magnetite from a magnetite solution storage tank 41 are fed into the device, which is then agitated by a stirrer 43 in a quick stirrer unit 42 to produce micro-flocs. Inorganic flocculant and magnetite can be fed in any order and may be fed at the same time. Then, an organic flocculant 46 such as a polymer is added and agitated by a stirrer 45 in a slow-speed stirrer 44 to produce flocs in a size of several hundred microns to several millimeters. The flocs enter the separating section, and the fluid including flocs, of which speed has been increased by the rotational force of a non-magnetic rotating drum 49, head to a magnetic drum 50. The floc attaching to the surface of the magnetic drum is scraped from the surface thereof by a scraper 52 and a brush roller 51 that are in press-contact with the surface of the magnetic drum. Plankton and micro-flocs in the fluid 59 are flocculated and become flocs, which are removed from the fluid by the magnetic drum 50 described above. A separation section may be the separation section shown in above-stated FIG. 3.

Figure 6:
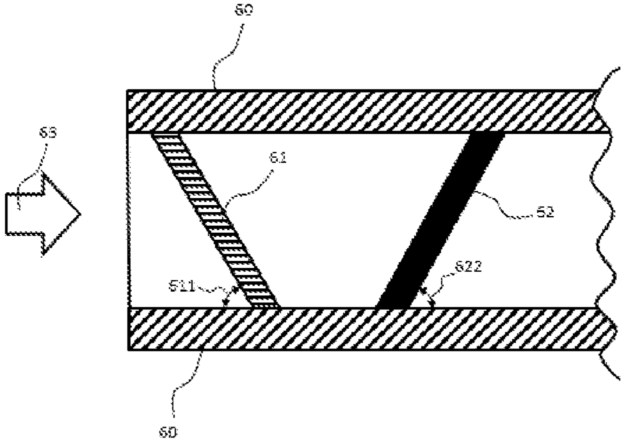
FIG. 6 This figure shows an example of the slit mechanism of the present invention for breaking plastics floating in the sea.

FIG. 6 shows an example of the slitting mechanism for breaking plastics floating in the ocean. When plastics drifting in the sea is taken in by a ballast pump together with ballast water, seawater 63 is sucked also into a pipe 60 by the ballast pump, which is not shown in the figure. A first slit section 61 is arranged at a predetermined angle 611 with respect to the fluid to be sucked. A second slit section 62 is arranged at the rear stage of the first slit section 61 at a predetermined angle 622, which is different from the angle 611, with respect to the fluid to be sucked. The reason that the angle 611 is an acute angle and the complementary angle of the angle 622 is an obtuse angle in relation to the sucking direction of seawater 63 is to prevent clogging between the slit 61 and the slit 62 caused by drifting plastics. The slits are placed at a predetermined angle with respect to the inflow direction so that the shearing force can work.

Figure 7:
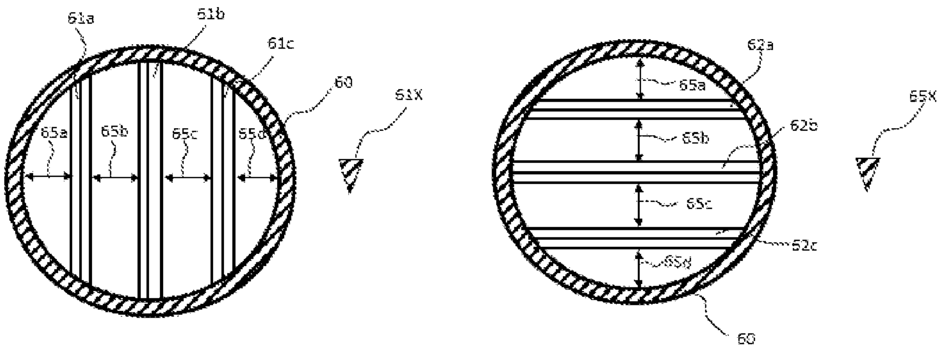
FIG. 7 This figure shows an example of the slit in a slitting mechanism of the present invention for breaking plastics floating in the sea.

FIG. 7 shows an embodiment example of the slit section of a slitting mechanism that breaks plastics floating in the ocean. A slit section 61 of a pipe 60 comprises plates 61*a*, 61*b*, and 61*c* each for forming slits thereon, as shown in FIG. 6. A slit section 62 shown in FIG. 6 comprises plates 62*a*, 62*b*, and 62*c* each for forming slits thereon. The cross-section of the plates 61*a*, 61*b*, 61*c*, 62*a*, 62*b*, and 62*c* are acute angles 61*x* and 65*x* with respect to the inflow direction. The reason for being the acute angle is to break the inflowing plastic. The plates 61*a*, 61*b*, 61*c*, 62*a*, 62*b*, 62*c* are arranged at equal intervals of 65*a*. 65*b*, 65*c*, and 65*d*. However, considering that the flow rate of the middle part is the maximum, spacings wider than the intervals 65*b* and 65*c* can be given to the plates 65*a* and 65*d*. With this, the effect for reducing the probability that the plastic waste may clog the slits will be produced.

FIG. 8 shows an embodiment example of the broken plastic recovery mechanism of the present invention. A fluid 73 such as seawater that includes a plastic 77 broken by the slit mechanism mentioned before flows in through a pipe 72. An endless belt filter 70, consisting of a filter of predetermined mesh size, rotates continuously between the rollers 71*a* and 71*b*, and the fluid 73 containing the broken plastics 77 passes between the rollers 71*a* and 71*b*. While passing, the endless belt filter 70 holds and conveys the broken plastics 77, which is then separated by a scraper 75 press-contacted on the endless belt filter 70, and the separated broken plastics 77 are put in a floe recovery tank 76. Further, the fluid 73 from which the broken plastics 77 has been removed flows into a pipe 74. The fluid 73 contains fine floating matter such as microplastics and plankton. The fluid 73 is sent to the flocculation and magnetic separation device 55 described above and undergoes flocculation and magnetic separation to become the fluid 59. In some cases, this recovery mechanism is installed at the rear stage of the magnetic separation mechanism to filter the objects that cannot be magnetically separated.

Figure 9:
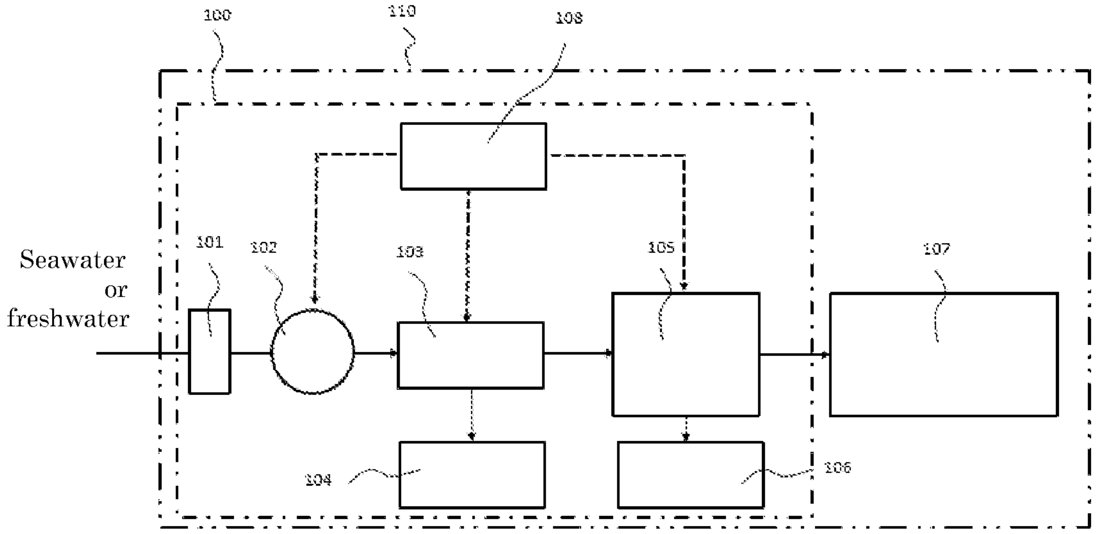
FIG. 9 This figure shows an example of the marine plastic, microplastic, and ballast water purification system of the present invention.

FIG. 9 shows an embodiment example of the marine plastic, microplastic, and ballast water purification system of the present invention. The marine plastic, microplastic, and ballast water purification system 100 is a system that is equipped on a ship.

The system comprises:

- a slitting mechanism 101 for breaking plastics,
- a pump 102 for supplying and draining seawater or freshwater,
- a recovering mechanism 103 for recovering large floating matters of tens of mm or more such as broken plastics,
- a recovery tank 104 for temporarily storing the recovered floating matters,
- a flocculation and magnetic separation mechanism 105 for recovering small floating matters of less than tens of mm, such as microplastics and plankton,
- a recovery tank 106 for temporally storing removed flocs that include microplastics or the like, and
- a control mechanism 108.

The flocculation and magnetic separation device 105 can be a composite mechanism that is a combination of a filter such as a ceramic filter and ozone or ultraviolet light. The treated water is temporarily stored in a ballast tank 107.

Figure 10:
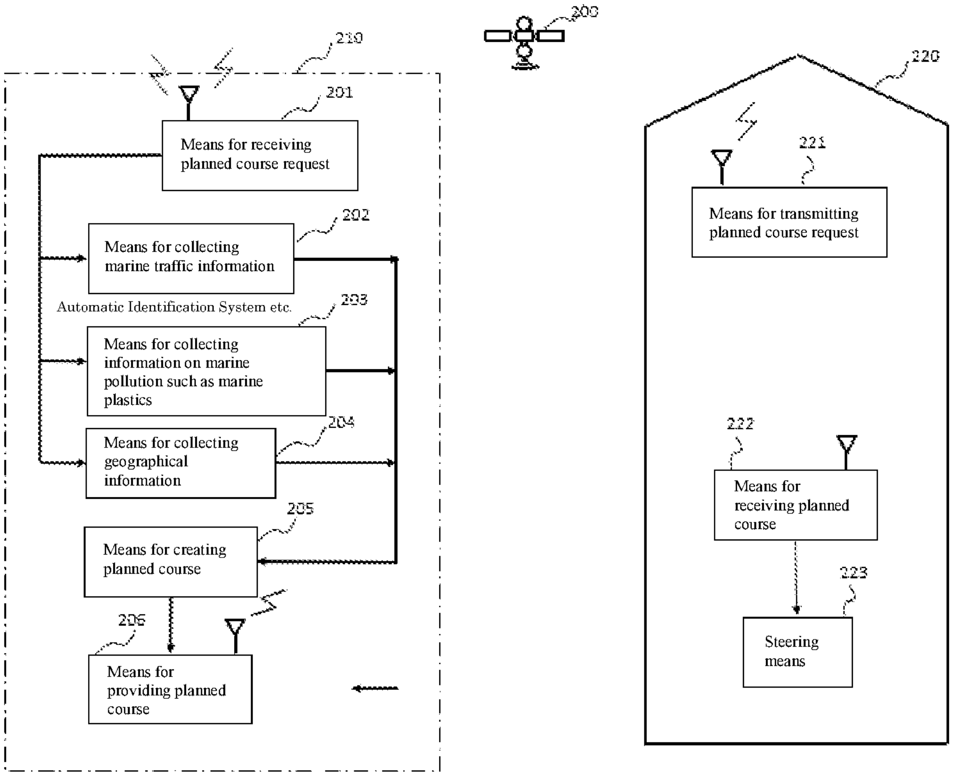
FIG. 10 The figure shows an embodiment example of the operation of a ship equipped with the system for purifying marine plastic, microplastic, and ballast water.

FIG. 10 shows an embodiment example of the operation method of the marine plastics, microplastics, and ballast water purification system.

A course plan information center 210 is configured with:

- a means for acquiring marine traffic information 202,
- a means for collecting marine plastic information 203,
- a means for collecting geographic information 204,
- a means for creating planned course 295.
- a means for receiving planned course request 201, and
- a means for providing planned course 206.

The means for acquiring marine traffic information 202 gathers the information of the automatic vessel identification system and other similar information collected from the base stations not illustrated in the figure. The means for collecting marine plastic information 203 collects information on the pollution caused by marine plastics in the sea area of which state is gathered by a satellite 200. The means for acquiring geographic information 202 acquires the location of own ship, the port of destination, and the geographic information on the sea area between these two places included in the planned course request signal. A means for creating planned course 205 produces a planned course based on the information collected by the means for acquiring regional traffic information 202 mentioned above, the means for collecting marine plastics and other marine pollution information 203, and the means for collecting geographic information 204. When creating this planned course, the plan will take into account whether the ballast water is loaded, how much are the quantity of loaded ballast water when loaded, whether the removal work of ocean plastics and other marine pollution matters can be performed, and the urgency of the ocean plastics removal work. A ship 220 is equipped with a means for transmitting the planned course request 221, a means for receiving the planned course 222, and a steering means 223 that operates reflecting the received results. The results of the removal work for marine plastics and other marine pollution matters (removed marine area, amount of removed marine plastics, and other marine pollution matters) are transmitted to the course plan information center 210. The course plan information center transmits this information to the International Maritime Organization (IMO) and other public organizations, and environmental protection groups. International organizations, such as the International Maritime Organization, and environmental protection groups will make this information available to the public and formulate strategies against marine pollution. As a result, if further removal of pollution is necessary, cooperation will be asked ships that are scheduled to sail near the area in question for taking measures against marine pollution. The collected marine plastics and other marine pollutants will be purchased by the government or municipality of the port of call as industrial waste. This means that the ships equipped with marine plastics, microplastics, and ballast water purification systems will take the charge of cleaning the ocean in addition to transporting oil and other valuable materials.

Figure 11:
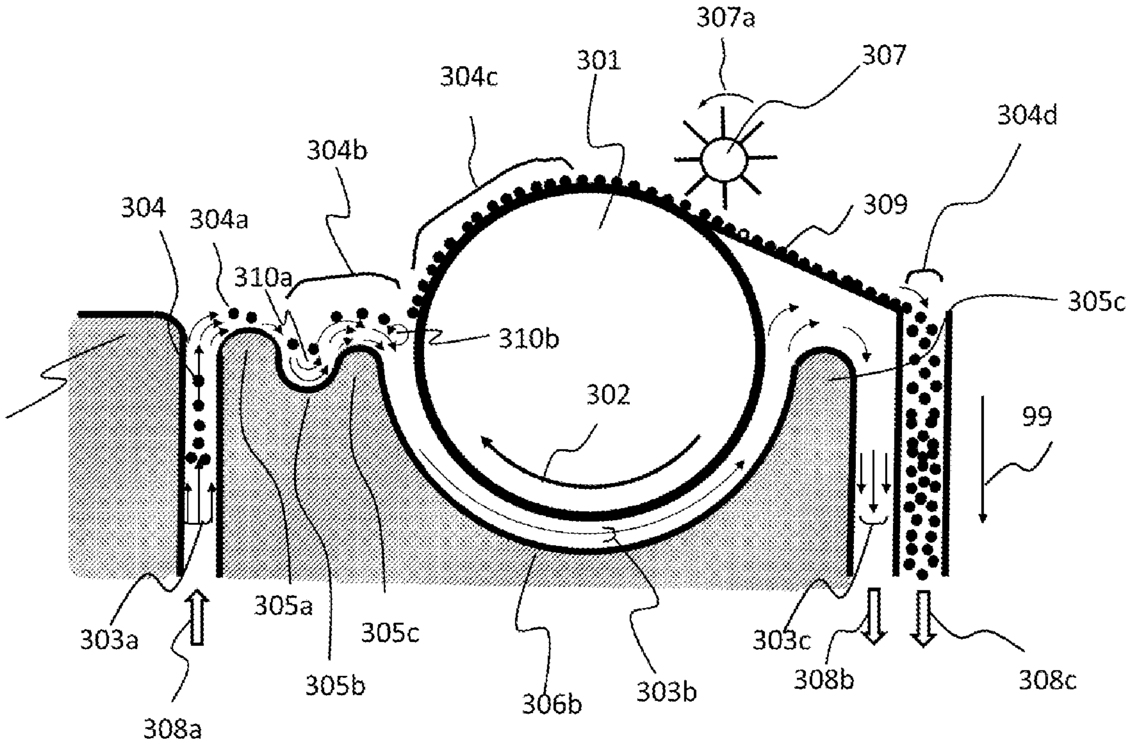
FIG. 11 This figure is a side view of an example of a configuration diagram of the magnetic separating section of the flocculation and magnetic separation device of the present invention.

FIG. 11 shows an embodiment example of the magnetic separating section of the flocculation and magnetic separation device of the present invention. A magnetic drum 301 having magnets near the surface thereof, and flocs 304 on a flow 308*a* from a flocculation section, which is not shown in the figure, containing magnetite and other magnetic substances flow in the direction opposite to the direction of gravity 99 toward the magnetic drum 301. The velocity distribution 303*a* in the flow 308*a* has the highest velocity almost at the middle and the low velocity at the wall of the flow channel. Therefore, the flocs gather in the center of the flow where the velocity is faster according to Bernoulli's law (Bernoulli's equation). In order to move the flocs 304 flowing in the middle of the fluid in the immediate front of the magnetic drum 301 to the fluid surface, the direction of flow is changed by about 180 degrees or so at a bump-like projection 305*a* having a predetermined curvature, and the fluid flows along a concave 305*a* having a predetermined curvature placed at the subsequent stage. This concave 305*b* and a bump-like protrusion 305*c* configure a waterfall-basin-like structure, which produces eddies 310*a*. Since the particle size of a floc 304*b* is larger compared to that of a fluid molecule, this size difference produces fluid resistance, which causes the eddies 310*a*. The eddies 310*a* make the flocs 304*b* float on the fluid surface. The flocs flow towards the magnetic drum 301. Since the direction of rotation of the magnetic drum 301 is opposite to that of a fluid flow 303*b*, this direction difference creates eddies 310*b*, and the velocity of the fluid in the eddies 310*b* cancels each other, resulting in a lower velocity of flocs 4*a*. Flocs 304*a* on the flow of low-velocity approach a magnetic drum 1 by the magnetic force and attracted thereon. Since the resistance acting on the flocs 304*a* is mainly surface tension, the flocs 304*a* are not easily broken. The magnetic drum 301 rotates in a direction 302 opposite to the flow 303*b*, so that the floc 304*b* on the drum is immediately separated from the water. Therefore, the contact area of the magnetic drum 301 required for separating magnetically the flocs 304*a* can be reduced to an extent several mm above and below the fluid surface. The reason for this is that when the flocs 304 are attracted to the magnetic drum 301, a new surface with no flocs attracted appears since the magnetic drum 301 is rotating. Therefore, the actual contact area on a magnetic drum 301 required for attracting flocs thereto by the magnetic force of the magnetic drum 301 is small. The magnetic drum 1 is not damaged by the fluid resistance. Furthermore, it is not necessary to consider the travel time of the flocks to adhere, by the magnetic force, to the magnetic drum 1 against the fluid resistance, as described in {Patent Literature 1}. Therefore, the magnetic drum 301 can be miniaturized. Flocs 304*c* on the magnetic drum 301 is separated therefrom by a scraper 309 pressed against the magnetic drum 301 and the brush roller 307 rotating in a rotation direction 307*a* opposite to the rotation direction 302, and the flocs 304*b* move onto the scraper 309. The flocs 304*b* are recovered by free fall due to gravity like flocs 304*d*. Further, the treated water from which the flocs have been removed flows along the magnetic drum 301 as shown in the flow 303*b*, and the direction of the flow is changed by about 180 degrees or so at the bump-like protrusion 305*c*. The treated water flows with a flow velocity distribution 303*c* and is discharged as a flow Sb. Further, the flocs 4*c* are discharged as a flow 308*c*.

INDUSTRIAL APPLICABILITY

The International Maritime Organization (IMO) established the Convention for the Control and Management of Ships' Ballast Water and Sediments (hereinafter referred to as the Convention) in order to prevent the destruction of ecosystems caused by seawater substitution by ships' ballast water which includes species that did not originally exist in the sea area. However, the problem of ocean pollution by plastics and microplastics has arisen. The mainstream of ballast water treatment method is a sterilization method using ultraviolet rays, ozone, hypochlorous acid, or the like. This method can kill aquatic organisms in ballast water. However, the problem of marine pollution caused by the above-stated plastics and microplastics cannot be solved. Even a ship that collects marine plastics is built, it is still difficult to recover microplastics, though such a ship can recover large plastics. The present invention provides a method for simultaneous solving the problem of ecosystem destruction caused by ballast water and the problem of marine pollution caused by plastics and microplastics.

{Reference Signs List}

| | |
|---|---|
| 1, 11b, 22a, 22b, 31, 50, 301 | Magnetic drum |
| 2, 12a, 12b, 22a, 22b, 78, 302 | Direction of rotation |
| 3a, 3c, 13a, 13b, 23a, 23b, 303a, 303b | Flow velocity distribution |
| 3b | Direction of flow |
| 4, 14, 304 | Flocs |
| 4a, 14a, 14c, 24a, 304a | Flocs flowing toward magnetic drum |
| 4b, 14d, 24b, 24d, 304c | Flocs attracted on magnetic drum |
| 4c, 14e, 14f, 24c | Recovered flocs |
| 5a, 5b, 15a, 15b, 15c, 25a, 25b, 25c | Bump-like protrusion |
| 6a, 6b, 16a, 16b | Wall surface |
| 7, 17a, 17d, 27a, 27b, 51, 307 | Brush roller |
| 7a, 17b, 17c | Brash roller rotation direction |
| 7a, 17b, 17c | Flow direction of fluid including flocs |
| 8b, 18b, 28b | Flow direction of treated fluid |
| 8c, 18c, 18d | Flow direction of recovered flocs |
| 9, 19a, 19b, 29a, 29b, 37, 52 | Scraper |
| 11a, 49 | Rotating drum |
| 34 | Flocs recovery section |
| 40 | Flocculant storage tank |
| 41 | Magnetite storage tank |
| 42 | Slow stirring device |
| 44 | Quick stirrer |
| 43, 44 | Stirrer |

-continued

{Reference Signs List}

| | |
|---|---|
| 46 | Polymer storage tank |
| 59, 63, 73 | Fluid |
| 60, 72, 74 | Pipe |
| 61, 61a, 61b, 61c, 62, 62a, 62b, 62c | Plate for forming slit |
| 61x, 65x | Cross section of plate |
| 65a, 65b, 65c, 65d | Plate spacing |
| 70 | Endless belt filter |
| 71a, 71b | Roller |
| 76 | Flocs recovery tank |
| 100 | Marine plastics, microplastics and ballast water purification systems |
| 101 | Filtering mechanism |
| 102 | Pump |
| 103 | Recovering mechanism |
| 104, 106 | Recovery tank |
| 105 | Flocculation and magnetic separation mechanism |
| 107 | Ballast tank |
| 108 | Control console |
| 200 | Satellite |
| 210 | Course plan information center |
| 201 | Means for receiving planned course request |
| 202 | Means for collecting marine traffic information |
| 203 | Means for collecting information on marine pollution such as marine plastics |
| 204 | Means for collecting geographical information |
| 205 | Means for creating planned course |
| 206 | Means for providing planned course |
| 210 | Ships |
| 221 | Means for transmitting planned course request |
| 222 | Means for receiving planned course |
| 223 | Steering means |
| 305a | Concave |

The invention claimed is:

1. A flocculation and magnetic separation device, comprising:

a stirrer for stirring a fluid that contains plastics and plankton putting flocculant, magnetic material, and polymer into said fluid to produce flocs;

a first magnetic drum having magnets on the surface thereof to attract said flocs thereon and rotating in the direction opposite to the flow direction of said floc-contained fluid to create eddies for attracting said flocs thereto;

a second magnetic drum having magnets on the surface thereof to attract said flocs, and rotating in the same direction as a fluid of which flow direction being changed at a protrusion arranged at the rear of said first magnetic drum so as not to cause peeling off of said flocs attracted to said second magnetic drum;

a floc recovering section for recovering by grouping said flocs attracted to said first magnetic drum and to said second magnetic drum into one; and a pipe into which a fluid containing plastic broken by a slit mechanism flows;

wherein said slit mechanism has a first slit section provided on said pipe at a predetermined angle; and a second slit section provided at the rear stage of said first slit section at an angle different from said predetermined angle;

wherein the cross section of both a slit plate of said first slit section and a slit plate of said second slit section is acute with respect to the flow-in direction.

2. A marine plastic, microplastic, and ballast water purifying system having the flocculation and magnetic separation device according to claim 1.

* * * * *